Oct. 9, 1973  G. W. PAUGH  3,764,343
CONTINUOUS COOKING METHOD
Filed Oct. 12, 1971  4 Sheets-Sheet 3
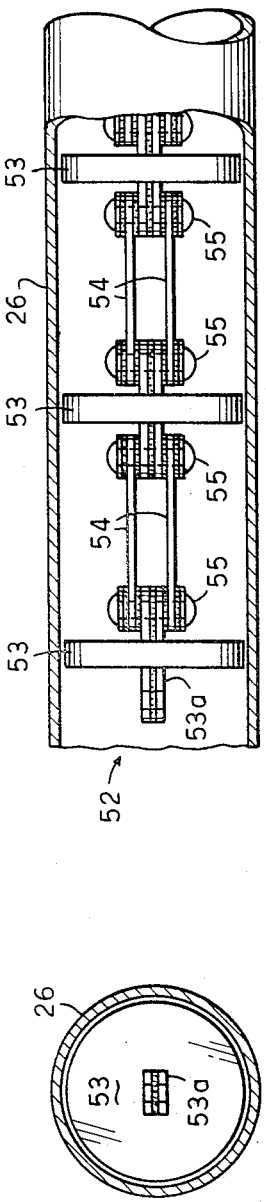
FIG. 4
FIG. 3
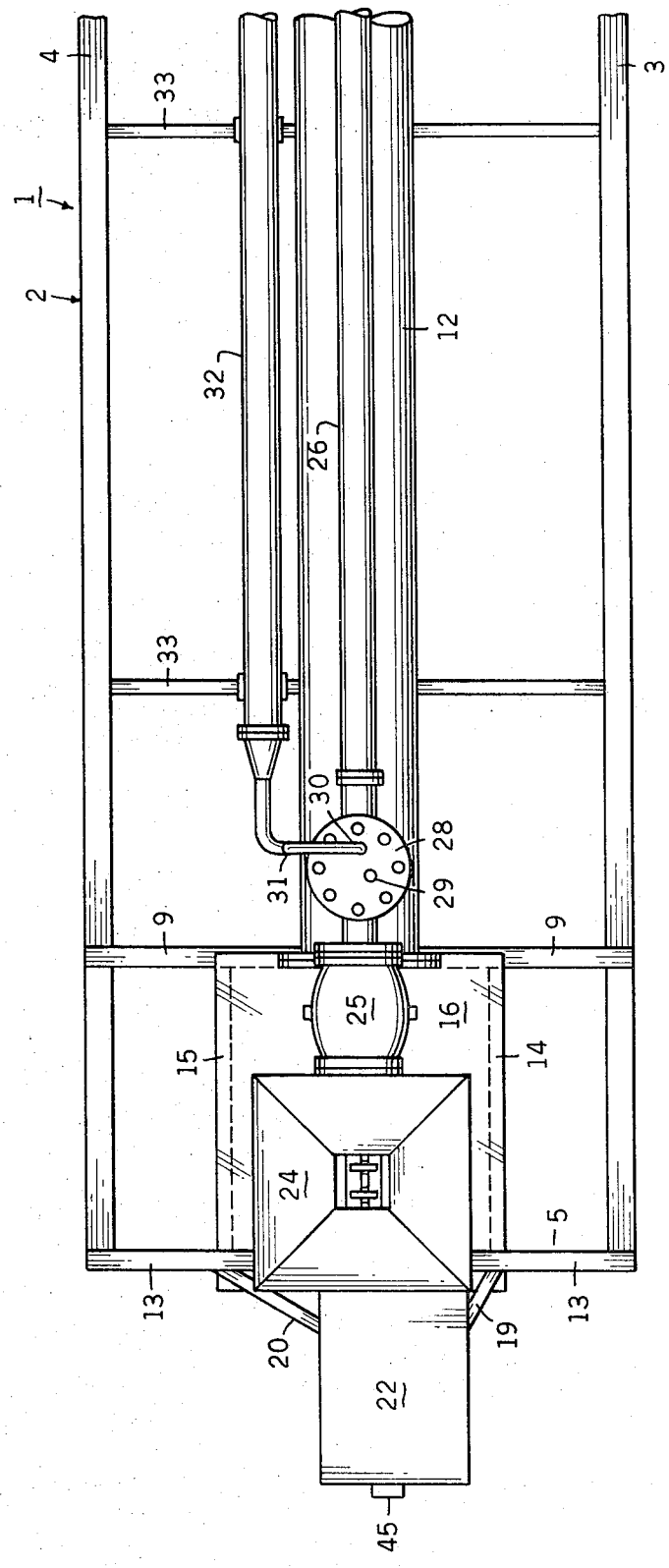
FIG. 2a Oct. 9, 1973  G. W. PAUGH  3,764,343

CONTINUOUS COOKING METHOD

Filed Oct. 12, 1971

United States Patent Office 3,764,343
Patented Oct. 9, 1973

3,764,343
CONTINUOUS COOKING METHOD
George W. Paugh, St. Louis, Mo., assignor to Ralston
Purina Company, St. Louis, Mo.
Filed Oct. 12, 1971, Ser. No. 188,383
Int. Cl. A23l 1/10
U.S. Cl. 426—352                    6 Claims

ABSTRACT OF THE DISCLOSURE

Method of continuously cooking food or raw grain materials by metering the materials to a conveyor having a plurality of conveying members thereon and a pair of restriction members to establish fluid pressure seals with the conveying members. The materials are then conveyed through one of the restriction members and discharged into a cooker which for grain operates at a temperature of about 240°–300° F. and in a pressure range of about 10–50 p.s.i.g. while the moisture is maintained in the range of 25–40%. The materials are then received in compartments formed by the conveying members, passed through the second restriction member and discharged from the conveyor in a cooked condition without loss of pressure in the cooker.

BACKGROUND OF THE INVENTION

In the preparation of grains for use in making breakfast cereals, it is desirable that the raw grain be cooked under pressure so as to partly gelatinize and flavor the grain. The present method utilized for achieving this cooking of the grain has been carried out on a batch process by utilizing equipment substantially similar to large pressure cookers. This equipment required that the cooker be loaded, sealed and then heated with steam under pressure. Due to the necessity of the equipment being constructed to withstand pressure, the equipment was large and bulky, requiring a considerable period of time to achieve a heating of the cooking vessel prior to the heating of the grain contained therein. Thus the use of such batch cooking equipment not only was time consuming because of the necessity of operator attention to achieve the loading and unloading of each batch of grain to be cooked, but was also time consuming due to the delay incurred in heating and cooling the vessel so it could be loaded and unloaded. Further, such batch cooking was undesirable because of the large number of batch cookers required in order to obtain satisfactory production rates.

It has also been attempted to utilize air locks or rotary valves at each end of a continuous cooker for maintaining the pressure within the continuous cooker while permitting the flow of grain into and from the cooker. However, such an air lock or rotary valve arrangement has not been satisfactory because of difficulty with the grain becoming clogged or packed within the valve. The clogging is primarily due to the heating and cooling effect obtained by the rotation of the valve which permits the condensation of moisture within the valve. Additionally, due to the heating and cooling of the valve member, it is difficult to maintain close tolerances between the rotary valve and its housing to prevent the escape of pressure from the cooker without experiencing binding of the rotary valve member within the housing.

SUMMARY OF THE INVENTION

It is therefore the principal object of the present invention to provide apparatus and a method for continuously cooking grain.

Another object of the present invention is to provide a unique grain conveying and valve arrangement which enables grain to be fed and discharged from a cooker on a continuous basis without the loss of heat and pressure from said cooker.

Another object of the present invention is to provide apparatus having an endless conveyor defining a plurality of conveying compartments, a pair of valve members about the endless conveyor for maintaining a predetermined pressure within a portion of the conveyor and a continuous cooker connected to the conveyor between the valve members for cooking the grain under pressure to a desired state prior to the conveyor discharging the grain therefrom.

Briefly one aspect of the present invention comprises apparatus having an endless conveyor belt including a plurality of conveying members thereon, a grain inlet and discharge portion on said conveyor, a pair of restriction members about the conveyor intermediate or between the grain inlet and discharge and forming a fluid pressure seal with the conveying members, and a cooker member having an inlet and outlet connected to the conveyor between or intermediate the restriction members, the grain being supplied to the inlet of the cooker, conveyed through the cooker during the cooking thereof and discharged from the outlet of the cooker to the conveyor while being maintained in a pressurized atmosphere.

Another aspect of the present invention comprises the method of continuously cooking grain under pressure wherein the grain is metered into conveyor compartments, passed through a restriction means which established a fluid pressure seal with the conveyor to substantially prevent the loss of pressure from the cooker, discharging the grain from the conveyor into the inlet of a cooker which operates under pressure, cooking the grain under pressure as it is moved from the inlet to the outlet of the cooker, discharging the cooked grain into the conveyor compartments, passing the conveyor through a second restriction means to substantially prevent the loss of pressure from the cooker, and removing the cooked grain from the conveyor compartments.

BRIEF DESCRIPTION OF THE DRAWINGS

In the drawings wherein like numerals refer to like parts:

FIGS. 2a and 2b are a top view of the continuous cooker of FIG. 1;

FIG. 3 is an end view of one of the conveying members of the endless conveyor inside one of the conveyor housings;

FIG. 4 is a partially broken away side view of the endless conveyor inside one of the conveyor housings.

DESCRIPTION OF THE PREFERRED EMBODIMENTS

Figure 1A:
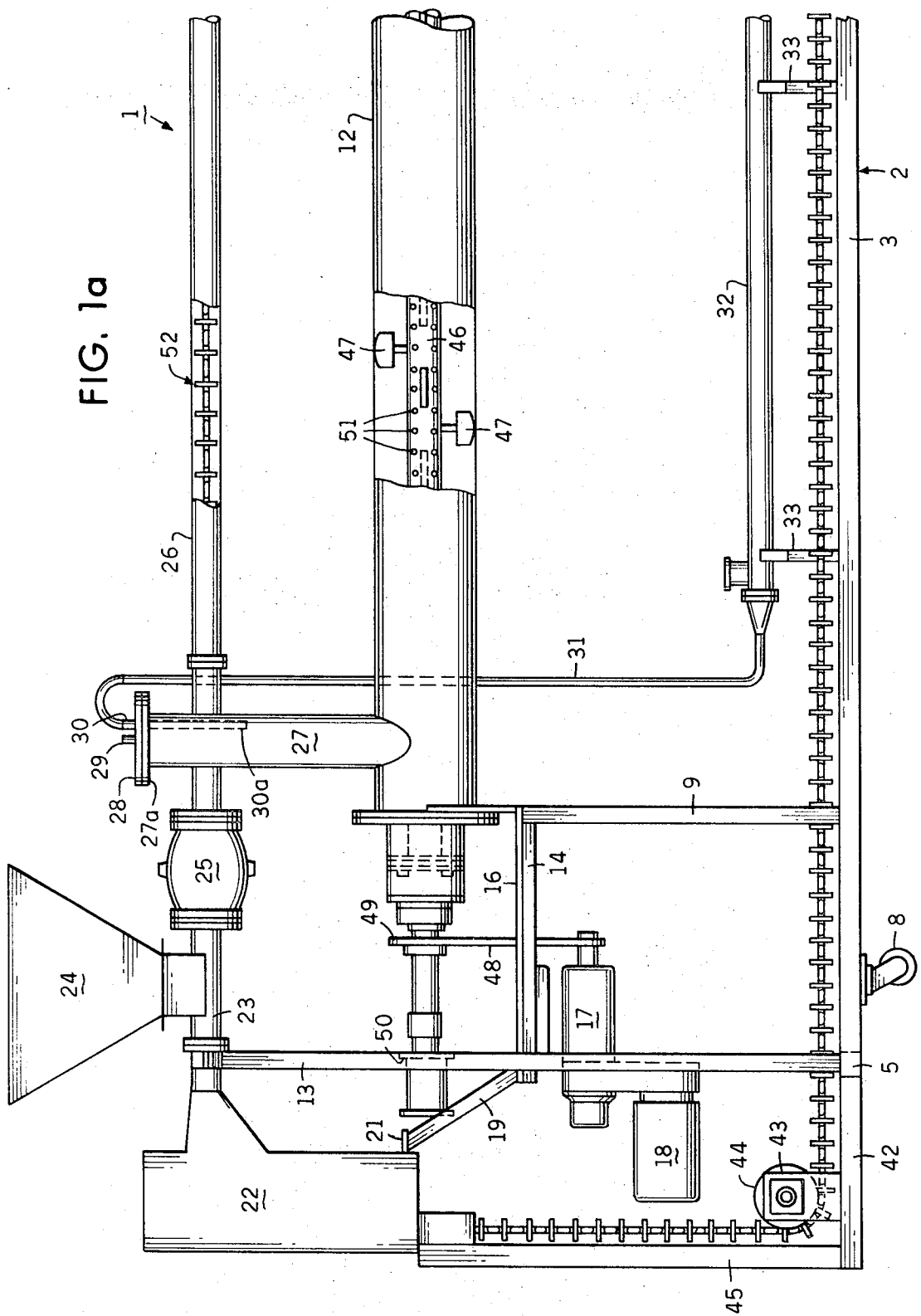
FIGS. 1a and 1b are a side view of the continuous cooker having portions thereof broken away.
Figure 1B:
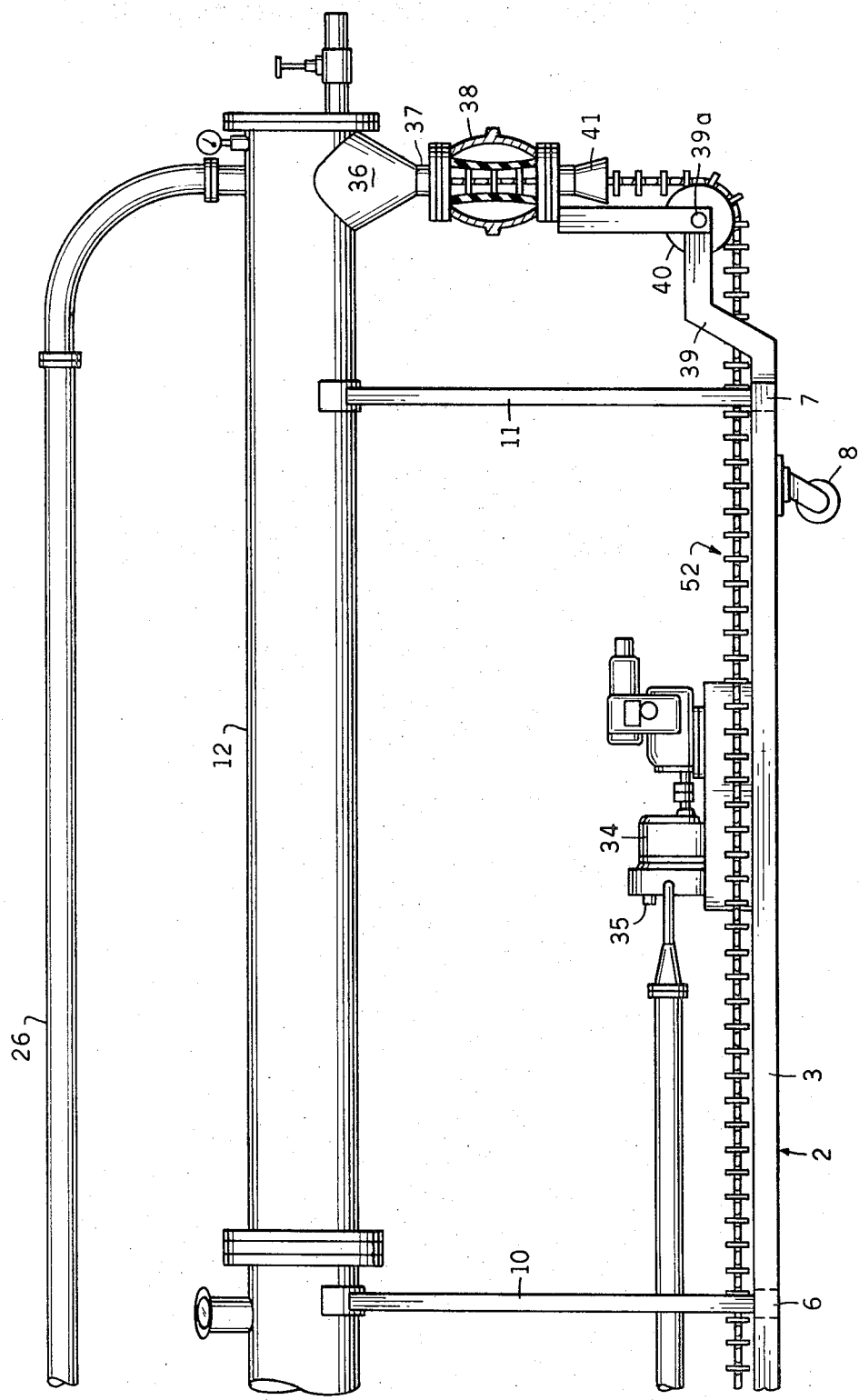

Referring now to FIGS. 1a, 1b, 2a and 2b, the continuous cooker apparatus 1 is provided with a frame indicated generally at 2 having horizontal support members 3, 4 which are connected by cross braces 5, 6 and 7. The frame 2 may if desired be mounted on wheels 8 which are connected to the horizontal members 3, 4. Brace members 9, 10 and 11 are provided on the horizontal members 3, 4 for supporting a tubular cooker housing 12.

Vertically extending brace members 13 are provided on the leftward end of the frame 2 and are connected to the vertical braces 9 by means of cross braces 14, 15. The cross braces 14, 15 have attached thereto, a plate member 16 by suitable means such as welds. Attached to the plate member 16 by suitable means such as bolts (not shown), is a gear reducer 17 having a drive motor 18 thereon. Angle iron braces 19, 20 are connected to the plate 16 by welds and are secured to the support plate 21 of the conveyor drive unit 22. The conveyor drive unit 22 is well-known in the art and essentially consists of a motor and gear reducer for driving a sprocket at a given rate of speed. A tubular conveyor housing 23 is connected to the drive mechanism 22 and supported by the braces 13. A grain inlet or funnel member 24 is connected to the tubular conveyor housing 23 to permit grain to be fed to said conveyor housing. A restrictor member or pressure valve member 25 has one end connected to the conveyor housing 23 and the other end thereof is connected to a conveyor housing 26. The conveyor housing 26 is also connected to the rightward end of the cooker housing 12.

Adjacent to the restrictor or valve member 25 and intersecting the conveyor housing 26 is a vertical chute member 27 which connects with the leftward or inlet end of the cooker housing 12. The upper end of the vertically extending chute 27 is provided with a flange end 27A and a cover plate 28 is in sealing engagement with the flange end 27A of the chute. The cover plate 28 has openings therein for a water inlet 29 connected to a source of water (not shown) and a flavoring supply inlet 30. The flavor supply inlet 30 includes a tube member 30A which extends into the chute 27 past the intersection thereof with the conveyor housing 26. The flavoring supply inlet 30 is connected by conduit member 31 to a heat exchanger 32 which is mounted on the frame 2 by suitable means such as braces 33 connected to the braces 3 and 4. A pump unit 34 is connected to the heat exchanger 32 and provided on the frame 2 by suitable braces 34A connected to the braces 3 and 4. The pump unit 34 is provided with a connector 35 which is adapted to be connected to the flavoring material reservoir, not shown. The pump 34 is effective for supplying the flavoring solution from the reservoir to the flavor inlet 30.

The tubular cooker housing 12 is provided with a discharge or outlet portion 36 adjacent the rightward end thereof, and is connected by means of a conveyor housing 37 to a restrictor member or pressure valve 38 substantially similar to the valve member 25. A pair of mounting brackets 39 are provided on the cross brace 7 on the rightward end of the frame 2 and receive a shaft 39A therein having a pulley 40 thereon. The mounting brackets 39 may also include vertically extending brackets to assist in the support of the restrictor valve member 38. If desired a discharge funnel member 41 may be provided on the restrictor valve member 38 to control the direction of the grain being discharged from the cooker.

A mounting bracket 42 is provided on the cross brace 5 of the leftward end of the frame 2. The mounting bracket 42 has provided thereon upright 43 to which is journaled an idler pulley 44. Also another upright 45 may be connected to the mounting bracket 42 to assist in supporting the conveyor drive mechanism 22.

The cooker housing 12 serves as a chamber through which the grain will be conveyed during the cooking process and is provided with a coaxially extending hollow shaft member 46. The shaft is provided with a plurality of paddle members 47 thereon and each of these paddle members are provided with an angle of approximately 15°–40° and preferably 30° to the axis of the shaft, which serves to urge the grain in the housing 12 from the inlet chute 27 to the discharge 36. A drive chain 48 is utilized to connect the shaft of the gear reducer 17 with a gear 49 provided on the shaft 46 for rotating said shaft. A rotary joint 50 is provided on the leftward end of the shaft 46 for connection to a steam source, not shown, such rotary joints are well-known in the art and the joint 50 permits the supply of steam to the shaft 46 without interference with the rotation of the shaft. The shaft 46 is hollow and provided with a plurality of holes 51 suitable for injection of the steam into the grain as it is conveyed within the cooker housing 12 from the inlet end 27 to the discharge 36. It should be understood that the holes 51 should be of a size and quantity to maintain the steam pressure and prevent the food product being cooked from entering the holes. In addition, it should be noted that the shaft 46 is provided with suitable bearings and packings at each end of the housing 12 to substantially prevent any loss of pressure from within the housing.

An endless conveyor belt, indicated generally at 52, is received within the conveyor housings 23, 26, 37 and is driven by the drive member 22. The conveyor 52 also passes around the pulleys 40 and 44. Referring more particularly to FIGS. 3 and 4, the conveyor consists of individual conveying members or disks 53 which are pivotally connected by means of a chain link 54. The pulleys 40, 44 readily receive the conveying disks 53 and permit the conveyor 52 to be driven in a positive manner by the drive unit 22. The conveying members 53 should be constructed of a material which is resistant to the temperatures to be utilized within the cooker 12. For instance when raw grain is the food being cooked, the temperature will be in the range of about 240°–300° F. Further the conveying members or disks should be of a material which is substantially impervious to moisture pick-up. Desirably, the disks or conveying members are constructed of a polypropylene material having a connecting portion 53A which is molded within the disk and which are connected to the chain link 54 in a pivotal manner by pins 55. Such conveyors are well-known in the industry. The disks 53 should be mounted such that the conveyor is located at substantially the center of the disks. This central mounting of the disks permits the conveying members 53 to pass through the restrictors or control valves 25 and 38 without binding. It should be noted that the conveying members or disks 53 are positioned to pass in close proximity to the walls of the conveyor housings 23, 26 and 37 such that conveying compartments are formed between the conveying members or disks and the conveyor housings for receiving and moving the food products. Further, it should be noted that the conveyor 52 passes through the rightward end of the cooker 12 and through the discharge or outlet portion 36 thereof for receiving or picking up the cooked food product to remove the cooked food product from the cooker.

Figure 5:
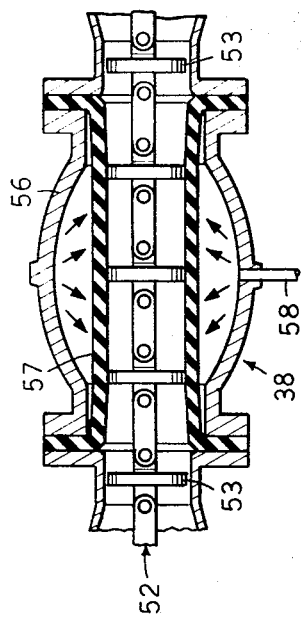
FIG. 5 is a section view of a restrictor member of the continuous cooker of FIG. 1 establishing a fluid pressure seal with the endless conveyor.
Figure 2B:
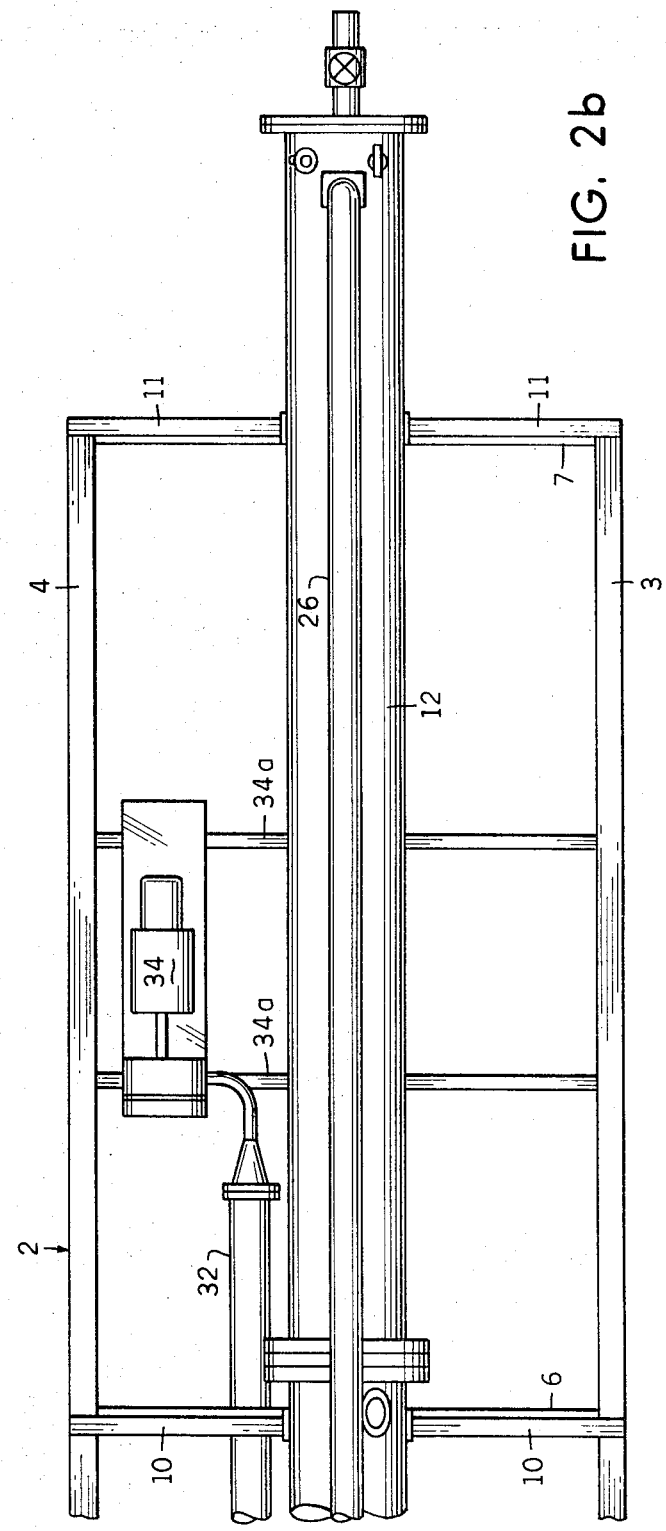

Since the restrictor or valve members 25 and 38 are identical only one of these valves and its operation will be described in detail. As seen in FIG. 5, the restrictor or valve member 38 is provided with a housing 56 containing a diaphragm member 57 therein which surrounds the path of travel of the conveyor 52 and permitting the conveyor 52 to pass therethrough. The housing is also provided with an air inlet 58 which permits a pressure fluid or compressed air, from a source not shown, to be introduced into the area between the housing 56 and diaphragm member 57. By controlling the air supplied to the valve member 38, the diaphragm member 57 may be urged to a position establishing and regulating the fluid pressure seal formed with the conveying members 53 on the conveyor 52. Thus the restrictors 25 and 38 form fluid pressure seals with the conveying members 53 and since the conveyor housing 26 does not permit the loss of pressure from about the conveyor 52, the restrictors 25 and 38 are effective in maintaining the pressure within the cooker 12 as the conveyor 52 is driven on the machine 1 to deposit and remove the food products from the cooker.

In the operation of the machine, air pressure is supplied to the restrictor members 25 and 38 to establish sufficient pressure on the diaphragms 57 to establish the fluid pressure seal between the diaphragm 57 and the conveyor members 53 as they are passed through the restrictor members 25 and 38. Steam is supplied through the rotary joint 50, shaft 46 and openings 51 to the interior of the cooking housing 12 to heat the cooker 12 to the desired temperature. The drive mechanism 22 is energized which serves to move the endless conveyor 52 through the conveyor housings 23, 26 and 37, the restrictor members 25 and 38 and around the pulleys 40 and 44. In addition, the motor 18 is activated which serves to rotate the shaft 46 within the cooker housing 12. After the cooker 12 has reached the desired temperature and pressure for cooking, a food product such as raw grain and particularly wheat, is then fed through the inlet 24 where it is picked up or received in the conveying compartments formed by the conveying members 53 of the conveyor 52 in the housing 23 and moved rightwardly. The grain in the compartments formed between the conveying members 53 and the conveyor housing 23 is then passed through the restrictor member 25 wherein the fluid pressure seal is established between the diaphragm member 57 and conveying members 53 to prevent the loss of pressure from the cooker 12. As the grain is moved rightwardly through the conveyor housing 26, gravity serves to permit the rain to flow through the supply chute 27 into the leftward or inlet end of the cooking housing 12. The supply of water from the water pipe 29 also serves to flush or wash the grain from the conveyor 50 so as to assure that substantially all of the grain is discharged within the supply chute 27. Simultaneously, a predetermined quantity of flavoring material is supplied through the heat exchanger 32 and into the inlet opening 30 and tube 30A. Since the tube 30A extends past the conveyor 52, the conveyor is not covered or contacted with this flavoring material. Preferably, this flavoring material will be heated to a temperature of approximately 190° F. to insure its complete sorption by the grain within the cooker during the cooking thereof. The conveyor 50 then continues its rightward movement in an empty condition until it reaches the discharge 36 of the cooker 12. It should be noted that the conveyor housing 26 is constructed to prevent the loss of pressure therefrom, so that the pressure within the cooker 12 is maintained at the desired level intermediate the restrictor members 25 and 38. After the grain has been deposited at the inlet of the cooker housing 12, the steam discharged from the openings 51 and the movement of the grain by the paddles 47 is controlled to obtain the desired degree of cooking of the grain as it is moved rightwardly towards the discharge or outlet 36. The cooking for grain should be carried out at a temperature of about 240° F. to about 300° F. and the cooking time should have a duration of about 15 minutes to about 35 minutes and preferably will last approximately 20 minutes at a temperature of about 270° F. The moisture content of the grain should be maintained within the range of 25%–40%, and this is controlled by the water fed through the inlet 29 and by the steam supplied through the openings 51. Further, the pressure within the cooker 12 may be maintained within the desired range of 10–50 p.s.i.g. due to the fluid pressure seals established between the conveyor disks 53 and restrictors 25 and 38 as the grain is supplied to and discharged from the cooker. As the grain reaches the discharge or outlet opening 36, the conveyor 52 again picks up or receives the grain between the conveying members 53 and conveyor housing 37 to pass through the restrictor member 38. The fluid pressure seal is established within the restrictor or valve member 38, as previously described, with respect to the input of the grain. It should be understood that the restrictor member 38 and conveyor 52 function such that there is substantially no loss of pressure from the cooker as the grain is discharged therefrom. As the conveyor 52 exits from the restrictor 38 and passes around the pulley 40, the grain is discharged from the conveyor 52 due to the force of gravity.

If desired discharge means may be provided on the mounting brackets 39 to insure the complete removal of the cooked grain from the conveyor 52. This may be done by providing an air blast on the conveyor 52, by providing nylon brushes for brushing the conveyor or by other means for insuring the complete removal of the grain from the conveyor. While the foregoing has been described in terms of continuously cooking grains, it should be realized that other food products could be cooked also and that changes in the cooking temperatures, time, moisture content and the pressure to be utilized would have to be made to suit the particular food being cooked. Such adjustments in these parameters would be obvious to one skilled in the arts with little trial testing being required.

Also it should be understood that it is possible to provide a resilient sealing material on the outer periphery of the conveying members or disks 53 so that a fluid pressure seal would be established by the conveying members and the conveyor housing. However, due to the constant movement of the sealing elements on the conveying members into contact with the conveyor housing to establish the fluid pressure seal, the wearing of the resilient material would require a substantial effort to replace the material on each of the conveyor members. As disclosed in the preferred embodiment of the present invention wherein diaphragm members are utilized in the restriction members 25 and 38, to replace a worn diaphragm to obtain the desired degree of fluid pressure seal would be quite simple and only require little effort. It is obvious that replacement of diaphragm members in the valves 25 and 38 would be easier than replacement of sealing members on the outer periphery of the conveying members.

In view of the foregoing, it is readily apparent that a novel machine is provided for continuously cooking food materials and that obvious modifications or changes in the exact configuration contained herein by way of example may be made without departing from the spirit of the invention which is defined by the claims which follow.

I claim:

1. A method of continuously cooking grain under pressure with flavoring materials to obtain flavored cooked grains useful for cereals comprising metering raw grain into conveyor compartments formed between conveying members, passing said conveyor compartments through restriction means forming a fluid pressure seal between the conveying members and said restriction means, depositing the grain into the inlet of a continuous cooker which is operated under pressure, the continuous cooker moving the grain from the inlet to the outlet as the grain is cooked under pressure, injecting a flavoring material into the continuous cooker as the grain is cooked, metering the cooked grain into other conveyor compartments formed between other conveying members at the outlet of the continuous cooker, passing said other conveyor compartments through a second restriction means to form a fluid pressure seal between the other conveying members and said second restriction means, the fluid pressure seals maintaining the pressure within the continuous cooker and discharging the cooked flavored grain from said other conveyor compartments.

2. The method according to claim 1 wherein the pressure maintained within said continuous cooker is within the range of 10–15 p.s.i.g.

3. The method according to claim 2 wherein the grain is heated at a temperature of about 240° F.–300° F. for approximately 15–35 minutes while the moisture content of the grain is within the range of approximately 25%–40%.

4. The method according to claim 1 wherein the flavoring material is heated to approximately 190° F. prior to injection into the continuous cooker.

5. A method of continuously cooking a food product under pressure comprising the steps of: metering the food product to conveyor compartments formed on a continuously moving conveyor, passing said food and conveyor compartments through restriction means to form a fluid pressure seal between said conveyor and said restriction means, depositing the food product into a cooking chamber, cooking the food product under pressure for a predetermined period of time, moving the food product through the cooking chamber during the cooking thereof, depositing the food product into the compartments of the continuously moving conveyor to remove the food product from the cooking chamber, passing said food and conveyor compartments through a second restriction means to form a fluid pressure seal between said conveyor and said second restriction means, the fluid pressure seals being effective to maintain the pressure in the cooking chamber as the food product is deposited in and removed from the cooking chamber, and discharging the cooked food product from said conveyor compartments.

6. The method according to claim 5 including the step of regulating the first named and other restriction means to control the fluid pressure seal formed with said conveyor.

References Cited
UNITED STATES PATENTS

| | | | |
|---|---|---|---|
| 3,181,955 | 5/1965 | Altman | 99—80 PS |
| 3,336,137 | 8/1967 | Hickey | 99—2 |

RAYMOND N. JONES, Primary Examiner

U.S. Cl. X.R.

99—1, 324; 426—823